US008732822B2

(12) United States Patent
Schechter et al.

(10) Patent No.: US 8,732,822 B2
(45) Date of Patent: May 20, 2014

(54) DEVICE LOCKING WITH HIERARCHICAL ACTIVITY PRESERVATION

(75) Inventors: Stuart Schechter, Kirkland, WA (US); Alice Jane Bernheim Brush, Seattle, WA (US); Oriana Riva, Redmond, WA (US); Karin Strauss, Seattle, WA (US); Eiji Hayashi, Pittsburgh, PA (US)

(73) Assignee: Microsoft Corporation, Redmond, MA (US)

( * ) Notice: Subject to any disclaimer, the term of this patent is extended or adjusted under 35 U.S.C. 154(b) by 171 days.

(21) Appl. No.: 13/328,312

(22) Filed: Dec. 16, 2011

(65) Prior Publication Data

US 2013/0160110 A1  Jun. 20, 2013

(51) Int. Cl.
*G06F 21/00* (2013.01)

(52) U.S. Cl.
USPC .............. 726/19; 726/1; 726/2; 726/3; 726/4; 340/571; 455/441; 455/557; 455/41.2; 455/418

(58) Field of Classification Search
USPC ............. 726/1–4, 19; 340/571; 455/441, 557, 455/41.2, 418
See application file for complete search history.

(56) References Cited

U.S. PATENT DOCUMENTS

| 6,286,001 | B1 | 9/2001 | Walker et al. |
| 6,339,826 | B2 | 1/2002 | Hayes, Jr. et al. |
| 6,405,033 | B1 | 6/2002 | Kennedy, III et al. |
| 6,504,480 | B1 * | 1/2003 | Magnuson et al. ........... 340/571 |
| 6,546,002 | B1 | 4/2003 | Kim |
| 6,549,768 | B1 | 4/2003 | Fraccaroli |
| 6,920,455 | B1 | 7/2005 | Weschler |
| 6,941,134 | B2 | 9/2005 | White |
| 7,058,659 | B2 | 6/2006 | Ryu |
| 7,076,797 | B2 | 7/2006 | Loveland |
| 7,142,848 | B2 | 11/2006 | Owen et al. |
| 7,171,557 | B2 | 1/2007 | Kallahalla et al. |

(Continued)

FOREIGN PATENT DOCUMENTS

| CN | 1984402 | 6/2007 |
| CN | 101112072 | 1/2008 |

(Continued)

OTHER PUBLICATIONS

The Chinese Office Action mailed Dec. 19, 2012 for Chinese patent application No. 200980128048.8, a counterpart foreign application of U.S. Appl. No. 12/194,213, 9 pages.

(Continued)

*Primary Examiner* — Jeffrey Pwu
*Assistant Examiner* — Hee Song
(74) *Attorney, Agent, or Firm* — Dan Choi; Carole Boelitz; Micky Minhas

(57) ABSTRACT

Techniques are described for device locking with activity preservation at a specified level within a multi-level hierarchy of device states. Such locking enables a user to share a device with another user while specifying a particular level of access to the device, such as access to a particular class of applications, a specific application, or a specific task within an application. Determination of the authorized activity may be based on a currently active application, or on the particular user gesture. The level of functionality made available may be based on the number of times a user gesture is repeated. Gestures may include a selection of a hardware or software control on the device, issuance of a voice command, and the like.

20 Claims, 8 Drawing Sheets

(56) References Cited

U.S. PATENT DOCUMENTS

| | | | |
|---|---|---|---|
| 7,212,613 | B2 | 5/2007 | Kim et al. |
| 7,222,360 | B1 | 5/2007 | Miller |
| 7,272,388 | B2 | 9/2007 | Andrew et al. |
| 7,274,925 | B2 | 9/2007 | Chaar et al. |
| 7,346,921 | B2 | 3/2008 | Murren et al. |
| 7,366,798 | B2 | 4/2008 | Nordstrom et al. |
| 7,408,506 | B2 | 8/2008 | Miller |
| 7,634,455 | B1 | 12/2009 | Keene et al. |
| 7,958,562 | B2 | 6/2011 | Gaucas |
| 8,549,657 | B2 | 10/2013 | Karlson et al. |
| 2002/0044149 | A1 | 4/2002 | McCarthy et al. |
| 2003/0139192 | A1 | 7/2003 | Chmaytelli et al. |
| 2003/0187803 | A1 | 10/2003 | Pitt |
| 2004/0039909 | A1 | 2/2004 | Cheng |
| 2005/0107114 | A1 | 5/2005 | Ocock |
| 2005/0138110 | A1 | 6/2005 | Redlich et al. |
| 2005/0143171 | A1 | 6/2005 | Loose |
| 2006/0246872 | A1 | 11/2006 | Tarkkala |
| 2007/0028176 | A1 | 2/2007 | Perdomo et al. |
| 2007/0072616 | A1* | 3/2007 | Irani .......................... 455/441 |
| 2007/0111726 | A1 | 5/2007 | Lambert et al. |
| 2007/0180509 | A1 | 8/2007 | Swartz et al. |
| 2008/0051079 | A1 | 2/2008 | Forsgren |
| 2008/0080688 | A1 | 4/2008 | Burgan et al. |
| 2008/0082693 | A1 | 4/2008 | Meijer et al. |
| 2008/0101658 | A1 | 5/2008 | Ahern et al. |
| 2009/0089886 | A1 | 4/2009 | Cheng et al. |
| 2009/0116703 | A1 | 5/2009 | Schultz |
| 2009/0157560 | A1 | 6/2009 | Carter et al. |
| 2009/0158389 | A1 | 6/2009 | Waltenberg et al. |
| 2010/0066821 | A1 | 3/2010 | Rosener et al. |
| 2010/0115610 | A1 | 5/2010 | Tredoux et al. |
| 2010/0134310 | A1 | 6/2010 | Zheng et al. |
| 2010/0216509 | A1* | 8/2010 | Riemer et al. ............. 455/557 |
| 2010/0306832 | A1 | 12/2010 | Mu et al. |
| 2010/0311336 | A1 | 12/2010 | Huotari et al. |
| 2010/0321155 | A1 | 12/2010 | Ballard |
| 2011/0167344 | A1* | 7/2011 | Pan .............................. 715/716 |
| 2011/0247045 | A1 | 10/2011 | Rajagopal et al. |
| 2011/0275321 | A1 | 11/2011 | Zhou et al. |
| 2012/0046020 | A1 | 2/2012 | Tomasini |
| 2012/0084737 | A1* | 4/2012 | Gimpl et al. ................. 715/863 |
| 2012/0098768 | A1* | 4/2012 | Bendewald et al. .......... 345/173 |
| 2012/0100895 | A1 | 4/2012 | Priyantha et al. |
| 2012/0144468 | A1 | 6/2012 | Pratt et al. |

FOREIGN PATENT DOCUMENTS

| | | | |
|---|---|---|---|
| JP | 07203015 | A | 4/1995 |
| JP | 2003032353 | A | 1/2003 |
| KR | 20050037613 | A | 4/2005 |
| WO | WO2007130123 | | 11/2007 |

OTHER PUBLICATIONS

PCT Intl Search Report and Written Opinion for Application No. PCT/US2009/039509, dated Nov 18, 2009, 11 pgs.

U.S. Appl. No. 13/726,095, filed Dec. 22, 2012, King, et al., "Mobile Device Child Share".

U.S. Appl. No. 13/726,099, filed Dec. 22, 2012, King, et al., "Restricted Execution Modes".

The European Search Report mailed Jan. 17, 2013 for European patent application No. 09747072.8, 5 pages.

McGlaun, "Fixes for Distracted Driving Remain Unclear", retrieved at <<http://www.dailytech.conn/Fixes+For+Distracted+Driving+Remain+Unclear>>, DailyTech, LLC, published Jun. 12, 2012, 2 pages.

"No Tech Panacea for Tech-Distracted Driving", retrieved at <<http://mobile.slashdotorg/story/12/06/11/0556231/no-tech-panacea-for...>>, Slashdot, Dec. 6, 2011, 30 pages.

Office Action for U.S. Appl. No. 13/222,538, mailed on Feb. 14, 2013, Karin Struass, "Progressive Authentication", 33 pages.

Talbot, "App Battles Driver Distraction but Spares Passengers", Technology Review, India, Published by MIT, Feb. 14, 2012, 2 pages.

Campbell et al, "Biometrically Enhanced Software Defined Radios", Proc. Software Defined Radio Technical Conf, Orlando, Florida, Nov 2003, 6 pgs.

Covington et al, "Parameterized Authentication", Proc. 9th European Symposium on Research Computer Security, Lecture Notes in Computer Science, Sep. 2004, 18 pgs.

Jagadeesan et al, "A Novel Approach to Design of User Re-Authentication Systems", Proc 3rd IEEE Intl Conf on Biometrics: Theory, Applications and Systems, Sep. 2009, 6 pgs.

Klosterman et al, "Secure Continuous Biometric Enhanced Authentication", Technical Report, May 2000, 25 pgs.

Quick, "BizzTrust for Android Splits a Single Smartphone into Two Virtual Phones", Oct. 2011, retrieved Jan. 10, 2012 from http://www.gizmag.com/bizztrust-for-android/20114, 3 pgs.

Simonite, "One Smart Phone, Two Personalities", Oct. 2011, retrieved Jan. 10, 2012 from http://www.technologyreview.com/communications/38865, 3 pgs.

The Chinese Office Action mailed May 6, 2013 for Chinese Patent Application No. 200980128048.8, a counterpart foreign application of U.S. Appl. No. 12/194,213, 7 pages.

"Aventail and Trust Digital Launch Integrated Secure Mobile Access Solution", Retrieved from http://findarticles.com/p.articles/mi_pwwi/is_200602/ai_n16063742. Last accessed May 14, 2008, Feb. 2006, 4 pgs.

Hoffman, et al., "Multilateral Security in Mobile Applications and Location Based Services", Retrieved from http://www.igd.fhg.de/~jpeters/publications/peters2002a.pdf. Last accessed May 14, 2008, Europes Indep IT Security Conf., Oct. 2002, 18 pgs.

"iPad Parental Control (restricting app access)", iPad Reviews, Jailbreak Guides, Retrieved on: Oct. 13, 2011, Available at: http://ipaded.net/ipad/parental-control/, 5 pgs.

Kottahachchi, et al., "Access Controls for Intelligent Environments", Retrieved from http://people.csail.mit.edu/buddhika/publications/academics/ISDA04-AccessManager.pdf. Last accessed May 14, 2008, Intl Conf on Intelligent Systems Design and Application, Aug. 2004, 6 pgs.

Final Office Action for U.S. Appl. No. 12/194,213, mailed on Sep. 20, 2011, Amy Kathleen Karlson, "Owner Privacy in a Shared Mobile Device", 11 pages.

Digitalquest Tech News, Software Reviews, Tips and Tricks, "Restrict Access to Applications using AppLocker", Retrieved on: Oct. 13, 2011, Available at: http://www.dq.winsila.com/tips-tricks/restrict-access-to-applications-using-applocker.html, 3 pgs.

"Setting Up Simple Restricted Access", Retrieved on: Oct. 13, 2011, Available at: http://support.webvanta.com/article/99486-setting-up-simple-restricted-access, 3 pgs.

Stajano, "One user, many hats; and, sometimes, no hat—towards a secure yet usable PDA", Security Protocols Workshop, Springer, Verlag, Apr. 2004, pp. 51-64.

Temporale, "Removing Application Lock on Windows Mobile Standard Devices", Retrieved on: Oct. 13, 2011, Available at: http://www.mobilejaw.com/articles/2009/09/removing-application-lock-on-windows-mobile-standard-devices/, Sep. 2009, 13 pgs.

Weilenmann, et al., "Local use and sharing of mobile phones", Book, In B. Brown, N. Green and R. Harper (Eds). Wireless World: Social and Interactional Aspects of the Mobile Age, Springer Verlag, 2001, pp. 99-115.

Office action for U.S. Appl. No. 13/875,139, mailed on Oct. 3, 2013, Karlson, et al., "Owner Privacy in a Shared Mobile Device", 12 pages.

Office action for U.S. Appl. No. 13/222,538 mailed on Oct. 11, 2013, Strauss, et al., "Progressive Authentication", 38 pages.

Office action for U.S. Appl. No. 13/222,538 mailed on May 28, 2013, Strauss, et al., "Progressive Authentication", 43 pages.

* cited by examiner

DEVICE LOCKING WITH HIERARCHICAL ACTIVITY PRESERVATION

BACKGROUND

Mobile computing devices have become a useful tool to enable users to access information and services on the go. Devices such as smart phones, tablets, personal digital assistants (PDAs), and the like enable users to access the web, play games, communicate via email, instant messaging (IM), or text messaging, create and publish documents, engage in social and/or business networking, or engage in other useful and/or entertaining activities. Generally, mobile devices support two device access control states: fully locked and fully unlocked. In some circumstances, a user with a mobile device may wish to give another person access to the mobile device. However, giving the other person access to the device in the fully unlocked state could allow the person to take actions not desired by the device's primary user.

SUMMARY

This application describes techniques for device locking with activity preservation through use of a multi-level activity-locking hierarchy of device states. These techniques enable a first user of a device (e.g., a sharing user) to lock a device into a limited functionality state such that a second user (e.g., a receiving user) has access to data and/or functionality that relates to a particular activity on the device. The lock may be based on the current activity (e.g., a currently executing application) at a level within a multi-level hierarchy of device states. For example, the lock may allow the receiving user to continue with the current activity, to continue with a current session or task within the current activity, or engage in activities within a class of activities that includes the current activity. The lock may also allow limited activity that is determined based on one or more indications or gestures made by the sharing user. In this way, the sharing user may specify a level of access for the receiving user on the device, and prevent the receiving user from accessing undesired data and/or functionality.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Embodiments are directed to device locking with activity preservation at a specified level within a multi-level hierarchy of device states. Such locking enables a user to share a device with another user while specifying a particular level of access to the device. Traditionally, devices offer locking mechanisms with two device states: fully locked or fully unlocked. Such devices may be moved from the locked state to the unlocked state through entry of a valid user credential, such as a login, a password, a personal identification number (PIN), an identifying pattern trace, a biometric identification (e.g., face, voice, retina, or fingerprint identification), or other credential. In some cases, certain activities may be enabled when the device is in a locked state, such as making emergency phone calls, receiving calls, or taking photographs. However, even in such cases the user cannot select which activities to make available or a level of specificity for allowed activities.

Embodiments described herein enable a more granular level of control for device sharing, by enabling a user to enter one or more gestures that specify a particular device-locking state within a multi-level hierarchy of device states. Such gestures may be explicit or implicit, and may include selection of a hardware or software control on the device, use of a voice command, and the like. The number of times the gesture is repeated may indicate a locking level for the device such that the device is progressively placed into a different locking state following each gesture, as described further below.

Figure 1:
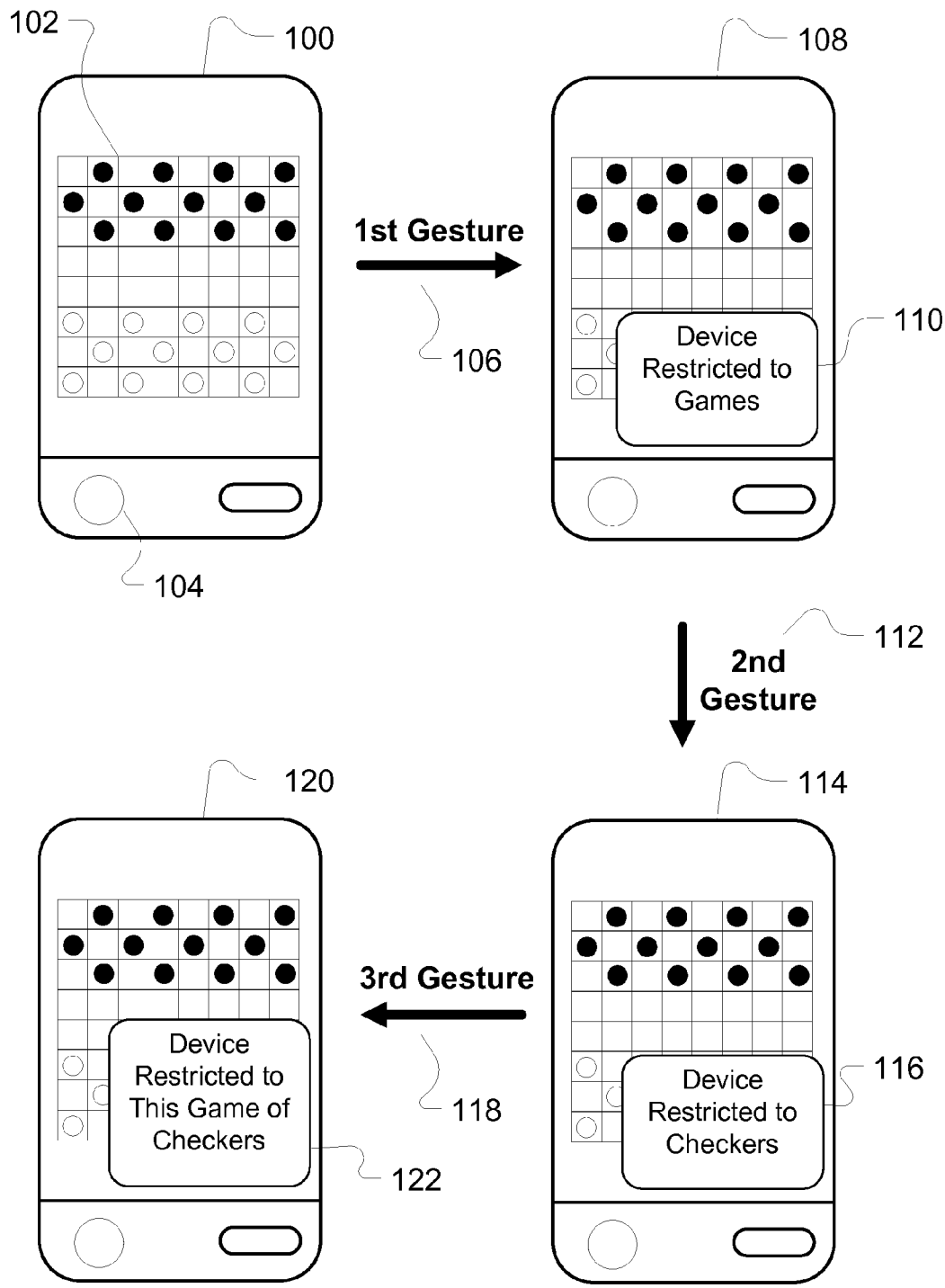
FIG. 1 illustrates an example computing device user interface, with example iterative gestures for requesting a device lock.

An example use case for embodiments is illustrated in FIG. 1, which shows an example device user interface 100 with an example application 102 currently active on the device. As shown, the example application 102 is a game of checkers. However, embodiments are not so limited, and any type of application and/or functionality may be supported. User interface 100 may include one or more controls such as control 104, and may include hardware or software controls.

In some embodiments as shown in FIG. 1, user interface 100 may be in a fully unlocked state when an indication of a first user gesture 106 is received. In some embodiments, the user gesture may be an explicit gesture by the user, such as a particular action taken by the sharing user (e.g., the device owner) to instruct the device to enter an activity-locked state. For example, the user gesture may be the sharing user's selection of a hardware control (e.g., a hard button on the device, such as control 104) or a software control (e.g., a software-rendered button or other control in user interface 100), the issuing of a voice command, or other explicit user gesture.

Moreover some embodiments may support the use of implicit user gestures. Such implicit user gestures may include actions taken by the sharing user, from which the system infers that the device is to be placed into an activity-locked state. For example, a sharing user may hand the device to his or her child. The device may then employ one or more biometric sensors or other means to determine that a different person is using the device and/or that the different person is a child. The device may then be locked into a particular activity-locking state (e.g., enabling execution of game applications or other age-appropriate functionality, but not other types of applications or functions). In some embodiments, the user gestures may be to some extent discreet, such that the receiving user is not made aware that the device has been placed into a particular activity-locking state.

In some embodiments, the number of user gestures detected within a particular time period may be used to determine the particular level for locking the device within the multi-level hierarchy of states, such that the device is progressively placed into different states following each gesture. For example, the first gesture may indicate that the device is to be placed into a device state 108 that is a first level of the multi-level hierarchy. In this example, the first level device state 108 allows a receiving user to continue executing the current application (e.g., checkers) as well as other applications within the same class as the current application (e.g., other games).

In some embodiments, the first gesture may cause a notification 110 or other user interface element to appear indicating the level of device locking. In some embodiments, notification 110 (as well as notifications 116 and 122) may appear for a particular, predetermined period of time to notify the user that the requested device locking has occurred. In some embodiments, these notifications may remain visible until dismissed by the user. In some embodiments, the notifications may be configured such that the sharing user confirms the requested locking level by dismissing the notification, and such that the device reverts to its previous state if the user does not dismiss the notification within a particular period of time.

The sharing user may then make a second gesture 112 to place the device into a device state 114 that is a second level of the multi-level hierarchy (e.g., to further restrict the scope of authorized activity on the device). In this example, the second level device state 114 allows the receiving user to continue executing the current application but no other applications. This second gesture may cause a notification 116 to appear indicating device locking at the second level. The sharing user may then proceed with the device locked at this level (e.g., give the device to the receiving user), or make a third gesture 118 to place the device into a device state 120 that is a third level of the multi-level hierarchy. In this example, the third level device state 120 allows the receiving user to continue executing the current application until a current task (e.g., the current game of checkers) is completed. The third gesture may cause a notification 122 to appear indicating device locking at the third level.

Although not shown in FIG. 1, embodiments may support other levels within the multi-level hierarchy. For example, a fourth gesture may indicate that the device is to be fully locked and activities are to be restricted to those available while the device is in the fully locked state (e.g., emergency telephone calls, photograph taking, and the like). In this way, embodiments support a multi-level activity-locking hierarchy in which the hierarchy levels include device functionality states of varying scope, e.g. class of application, single application, particular task within a single application, and fully locked.

Further, although FIG. 1 illustrates an example in which the scope of authorized activities decreases with each additional gesture, embodiments are not so limited. For example, embodiments may support an increase in scope with each additional gesture so that the first gesture restricts activities to a particular task within a single application, the second gesture restricts activities to the single application, the third gesture restricts activities to the class of applications, and so forth.

In some embodiments, device unlocking is in response to or otherwise depends on the receipt of a valid user credential to fully unlock the device, such as entry of a login, a password, a PIN, or biometric information such as voice, face, fingerprint, retina, or other identification. In some embodiments, the device is placed into a fully locked state on the satisfaction of one or more criteria. These criteria may include the expiration of a predefined time limit, completion of a particular task within the current application, termination of the current application, the entrance into a low battery level, or other criteria.

Illustrative Environment

Figure 2:
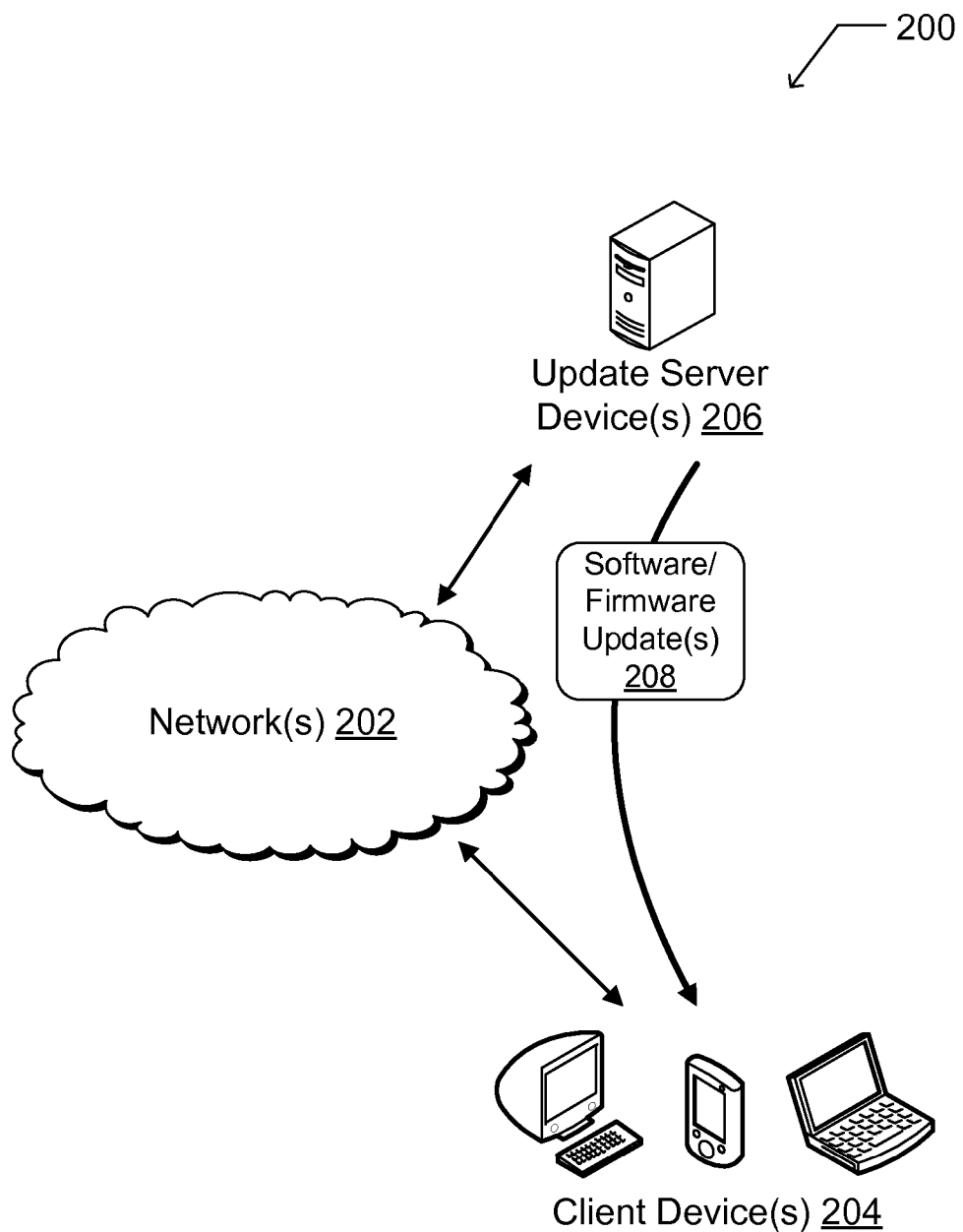
FIG. 2 is a schematic diagram depicting an example environment in which embodiments may operate.

FIG. 2 shows an example environment 200 in which embodiments may operate. As shown, the various devices of environment 200 communicate with one another via one or more networks 202. In some embodiments, networks 202 include public networks such as the Internet, private networks such as an institutional and/or personal intranet, or some combination of private and public networks. Networks 202 may also include any type of wired and/or wireless network, including but not limited to local area networks (LANs), wide area networks (WANs), Wi-Fi, WiMax, and mobile phone/communications networks (e.g. 3G, 4G, and so forth). Networks 202 may utilize communications protocols, including packet-based and/or datagram-based protocols such as internet protocol (IP), transmission control protocol (TCP), user datagram protocol (UDP), or other types of protocols. Moreover, networks 202 may also include a number of devices that facilitate network communications and/or form a hardware basis for the networks, such as switches, routers, gateways, access points, firewalls, base stations, repeaters, backbone devices, and the like.

Environment 200 further includes one or more client device(s) 204 associated with end user(s). Client device(s) 204 include any type of computing device that a user may employ. In some embodiments, client device(s) 204 may be configured to send and receive information over networks 202. Possible client device(s) 204 include, but are not limited to, desktop computers, laptop computers, tablet computers, wearable computers, media players, automotive computers, mobile computing devices, smart phones, personal digital assistants (PDAs), game consoles, mobile gaming devices, set-top boxes, and the like. Client device(s) 204 are described further herein with regard to FIG. 4.

Client device(s) 204 may include one or more functions, applications, and/or programs, including but not limited to communications applications (e.g., email, instant messaging (IM), text messaging, blogging, social networking, telephony applications, voice chat, video chat), gaming applications, multimedia entertainment applications (e.g., playing stored or stream audio, video, or graphics), video or image recording application, audio recording applications, document processing/viewing/editing applications, web browsing applications, information applications (e.g., providing information on weather, sports, investments, news, traffic, and the like), navigation applications, and the like.

Figure 3:
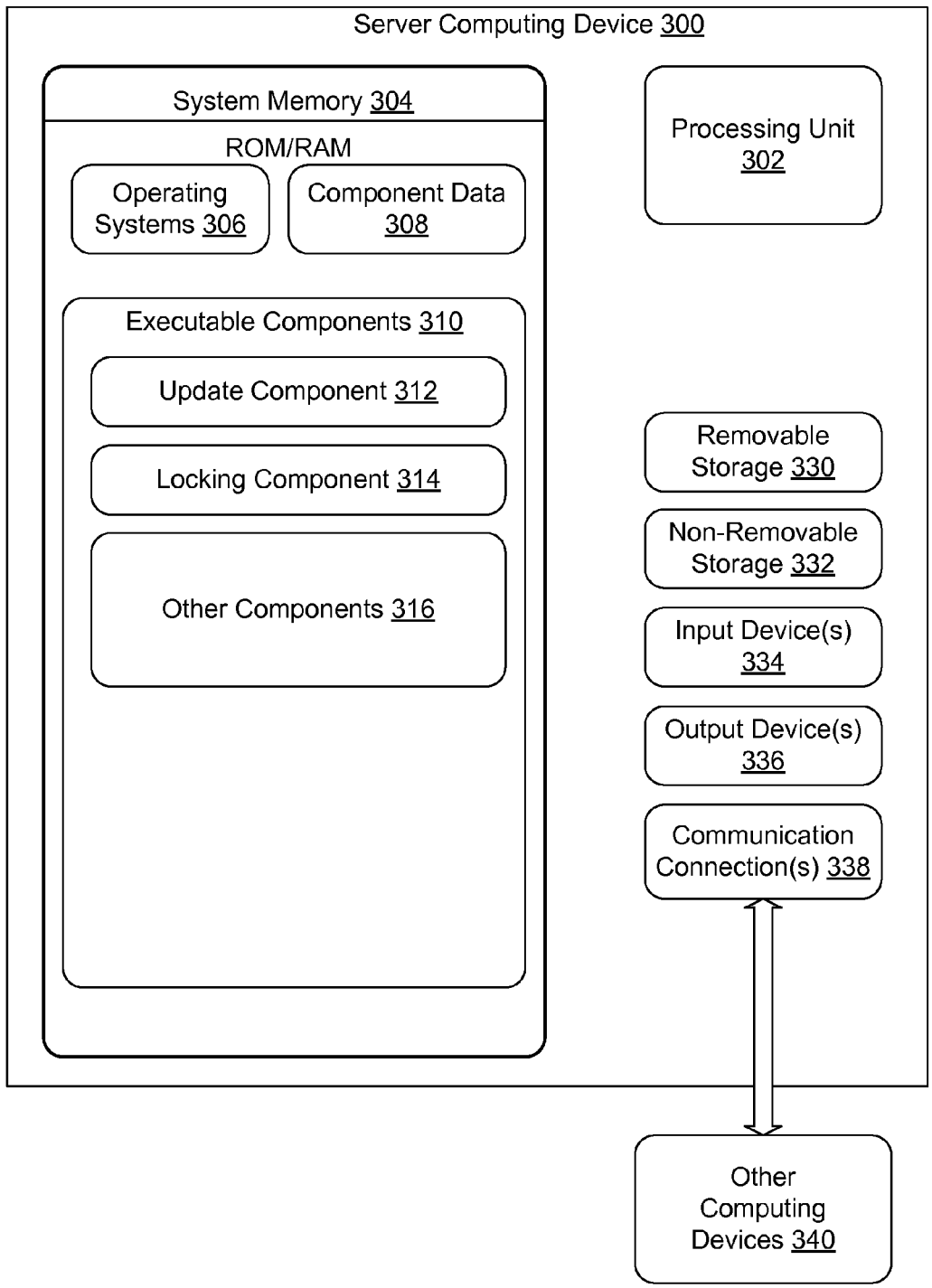
FIG. 3 is a diagram of an example server computing device, in accordance with embodiments, that may be part of the example environment of FIG. 2.

As shown, environment 200 may further include one or more update server device(s) 206, described further herein with regard to FIG. 3. Update server device(s) 206 may include computing devices that are configured to serve content and/or provide services to users over network(s) 202, and may be particularly configured to provide firmware or other software updates to client device(s) 204. Such software updates may include one or more new or updated operating system (OS) components (e.g., firmware) for the client device(s) 204, new or updated applications, or other information such as multimedia content. For example, as shown in FIG. 2, update server device(s) 206 may provide for software and/or firmware update(s) 208 to be downloaded to client device(s) 204, and such update(s) may include one or more components to enable multi-level activity-preserving device locking as described further herein. In some embodiments, these components may be installed and/or copied to the client device(s) 204 through other means, including but not limited to copying from a storage device (e.g., through a USB drive, CD, DVD, or other memory), or downloading from an online application vendor (e.g., an app store).

Each of the one or more of the devices depicted in FIG. 2 may include multiple computing devices arranged in a cluster, server farm, cloud, or other grouping to share workload. Such groups of devices may be load balanced or otherwise managed to provide more efficient operations. Moreover, although various computing devices of environment 200 are described as clients or servers, each device may operate in either capacity to perform operations related to various embodiments. Thus, the description of a device as client or server is provided for illustrative purposes, and does not limit the scope of activities that may be performed by any particular device. Moreover, in some embodiments one or more of the devices of environment 200 may be combined.

Illustrative Server Computing Device Architecture

FIG. 3 depicts a diagram for an example computer system architecture for the update server device(s) 206 depicted in FIG. 2. As shown, server computing device 300 includes processing unit 302. Processing unit 302 may encompass multiple processing units, and may be implemented as hardware, software, or some combination thereof. Processing unit 302 may include one or more processors. As used herein, processor refers to a hardware component. Processing unit 302 may include computer-executable, processor-executable, and/or machine-executable instructions written in any suitable programming language to perform various functions described herein. In some embodiments, processing unit 302 may further include one or more graphics processing units (GPUs).

Server computing device 300 further includes a system memory 304, which may include volatile memory such as random access memory (RAM), static random access memory (SRAM), dynamic random access memory (DRAM), and the like. System memory 304 may further include non-volatile memory such as read only memory (ROM), flash memory, and the like. System memory 304 may also include cache memory. As shown, system memory 304 includes one or more operating systems 306, and one or more executable components 310, including components, programs, applications, and/or processes, that are loadable and executable by processing unit 302. System memory 304 may further store program/component data 308 that is generated and/or employed by executable components 310 and/or operating system 306 during their execution.

Executable components 310 include one or more components to implement functionality described herein. For example, executable components 310 may include an update component 312 that operates to provide software updates to client devices as described above. In some embodiments, executable components 310 may also include a locking component 314 to be downloaded to client devices, to enable multi-level locking functionality on those devices as described further herein. Executable components 310 may further include other components 316. In various embodiments, executable components 310 may be distributed to operate on one device or on more than one device, in virtually any combination. Thus, the depiction of executable components 310 on a single server computing device 300 in FIG. 3 should not be construed as limiting.

As shown in FIG. 3, server computing device 300 may also include removable storage 330 and/or non-removable storage 332, including but not limited to magnetic disk storage, optical disk storage, tape storage, and the like. Disk drives and associated computer-readable media may provide non-volatile storage of computer readable instructions, data structures, program modules, and other data for operation of server computing device 300.

In general, computer-readable media includes computer storage media and communications media.

Computer storage media includes volatile and non-volatile, removable and non-removable media implemented in any method or technology for storage of information such as computer readable instructions, data structure, program modules, and other data. Computer storage media includes, but is not limited to, RAM, ROM, erasable programmable read-only memory (EEPROM), SRAM, DRAM, flash memory or other memory technology, compact disc read-only memory (CD-ROM), digital versatile disks (DVDs) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave or other transmission mechanism. As defined herein, computer storage media does not include communication media.

Server computing device 300 may include input device(s) 334, including but not limited to a keyboard, a mouse, a pen, a game controller, a voice input device for speech recognition, a touch input device, and the like. Server computing device 300 may further include output device(s) 336 including but not limited to a display, a printer, audio speakers, a haptic output, and the like. Server computing device 300 may further include communications connection(s) 338 that allow server computing device 300 to communicate with other computing devices 340, including client devices, server devices, databases, and/or other networked devices available over network(s) 202.

Illustrative Client Computing Device Architecture

Figure 4:
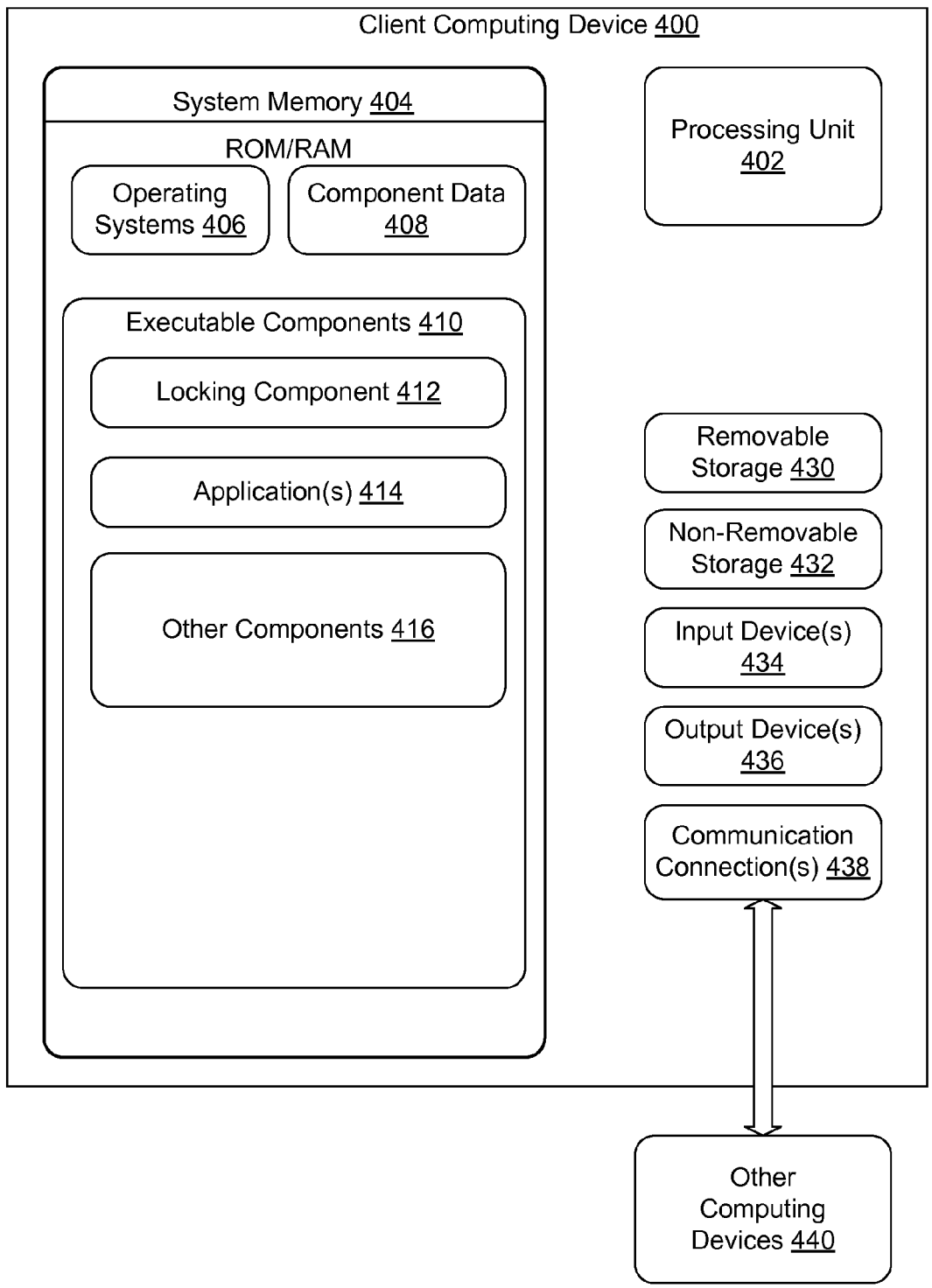
FIG. 4 is a diagram of an example client computing device, in accordance with embodiments, that may be part of the example environment of FIG. 2.

FIG. 4 depicts a diagram for an example computer system architecture for the client device(s) 204 depicted in FIG. 2. As shown, client computing device 400 includes processing unit 402. Processing unit 402 may encompass multiple processing units, and may be implemented as hardware, software, or some combination thereof. Processing unit 402 may include one or more processors. As used herein, processor refers to a hardware component. Processing unit 402 may include computer-executable, processor-executable, and/or machine-executable instructions written in any suitable programming language to perform various functions described herein. In some embodiments, processing unit 402 may further include one or more graphics processing units (GPUs).

Client computing device 400 further includes a system memory 404, which may include volatile memory such as random access memory (RAM), static random access memory (SRAM), dynamic random access memory (DRAM), and the like. System memory 404 may further include non-volatile memory such as read only memory (ROM), flash memory, and the like. System memory 404 may also include cache memory. As shown, system memory 404 includes one or more operating systems 406, which may provide a user interface including one or more software controls, display elements, and the like.

System memory 404 may also include one or more executable components 410, including components, programs, applications, and/or processes, that are loadable and executable by processing unit 402. System memory 404 may further store program/component data 408 that is generated and/or employed by executable components 410 and/or operating system 406 during their execution.

Executable components 410 include one or more components to implement functionality described herein. For example, executable components 410 may include a locking component 412 that provides multi-level locking functionality on client computer device 400 as described further herein. Executable components 410 may also include one or more applications 414 of various types. Executable components 410 may further include other components 416.

As shown in FIG. 4, client computing device 400 may also include removable storage 430 and/or non-removable storage 432, including but not limited to magnetic disk storage, optical disk storage, tape storage, and the like. Disk drives and associated computer-readable media may provide non-volatile storage of computer readable instructions, data structures, program modules, and other data for operation of client computing device 400.

In general, computer-readable media includes computer storage media and communications media.

Computer storage media includes volatile and non-volatile, removable and non-removable media implemented in any method or technology for storage of information such as computer readable instructions, data structure, program modules, and other data. Computer storage media includes, but is not limited to, RAM, ROM, erasable programmable read-only memory (EEPROM), SRAM, DRAM, flash memory or other memory technology, compact disc read-only memory (CD-ROM), digital versatile disks (DVDs) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave or other transmission mechanism. As defined herein, computer storage media does not include communication media.

Client computing device 400 may include input device(s) 434, including but not limited to a keyboard, a mouse, a pen, a game controller, a voice input device for speech recognition, a touch input device, a camera device for capturing images and/or video, one or more hardware buttons, and the like. Client computing device 400 may further include output device(s) 436 including but not limited to a display, a printer, audio speakers, a haptic output, and the like. Client computing device 400 may further include communications connection(s) 438 that allow client computing device 400 to communicate with other computing devices 440, including client devices, server devices, databases, and/or other networked devices available over network(s) 202.

Illustrative Processes

FIGS. 5-8 depict flowcharts showing example processes in accordance with various embodiments. The operations of these processes are illustrated in individual blocks and summarized with reference to those blocks. The processes are illustrated as logical flow graphs, each operation of which may represent one or more operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, subdivided into multiple sub-operations, and/or executed in parallel to implement the described processes.

In some embodiments, the processes depicted in FIGS. 5-8 execute on client device(s) 204 and/or may be performed by locking component 412. In some embodiments, these processes execute on a mobile device such as a cell phone, smart phone, tablet, PDA, wearable computer, gaming device, multimedia player, and the like.

Figure 5:
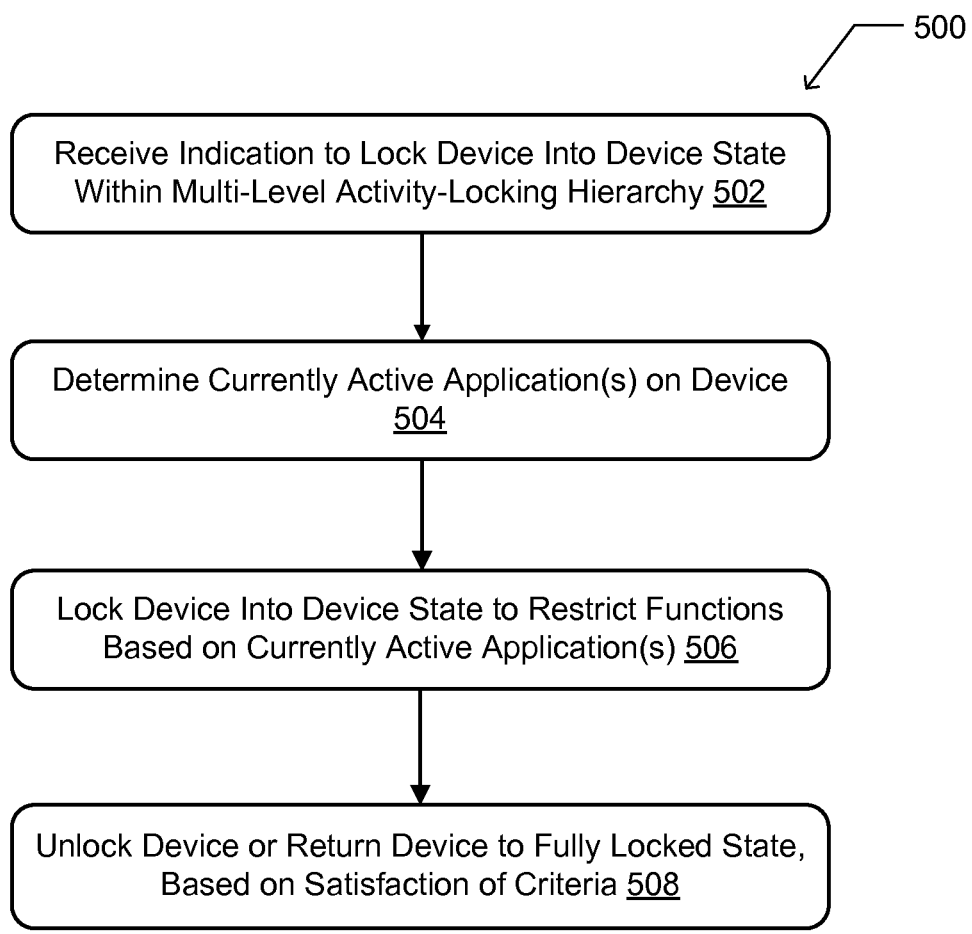
FIG. 5 depicts a flow diagram of an illustrative process for activity preserving device locking, according to embodiments.

FIG. 5 depicts an example process 500 for device locking with activity preservation, according to embodiments. At 502 an indication is received to lock the device into a device state within a multi-level activity-locking hierarchy. In some embodiments the device may be in an unauthenticated state prior to receiving the indication. For example, the device may be in a fully locked state, with limited applications or activities available to a user. In some embodiments, the device may be in an authenticated state prior to receiving the indication, and currently executing one or more applications.

Figure 6:
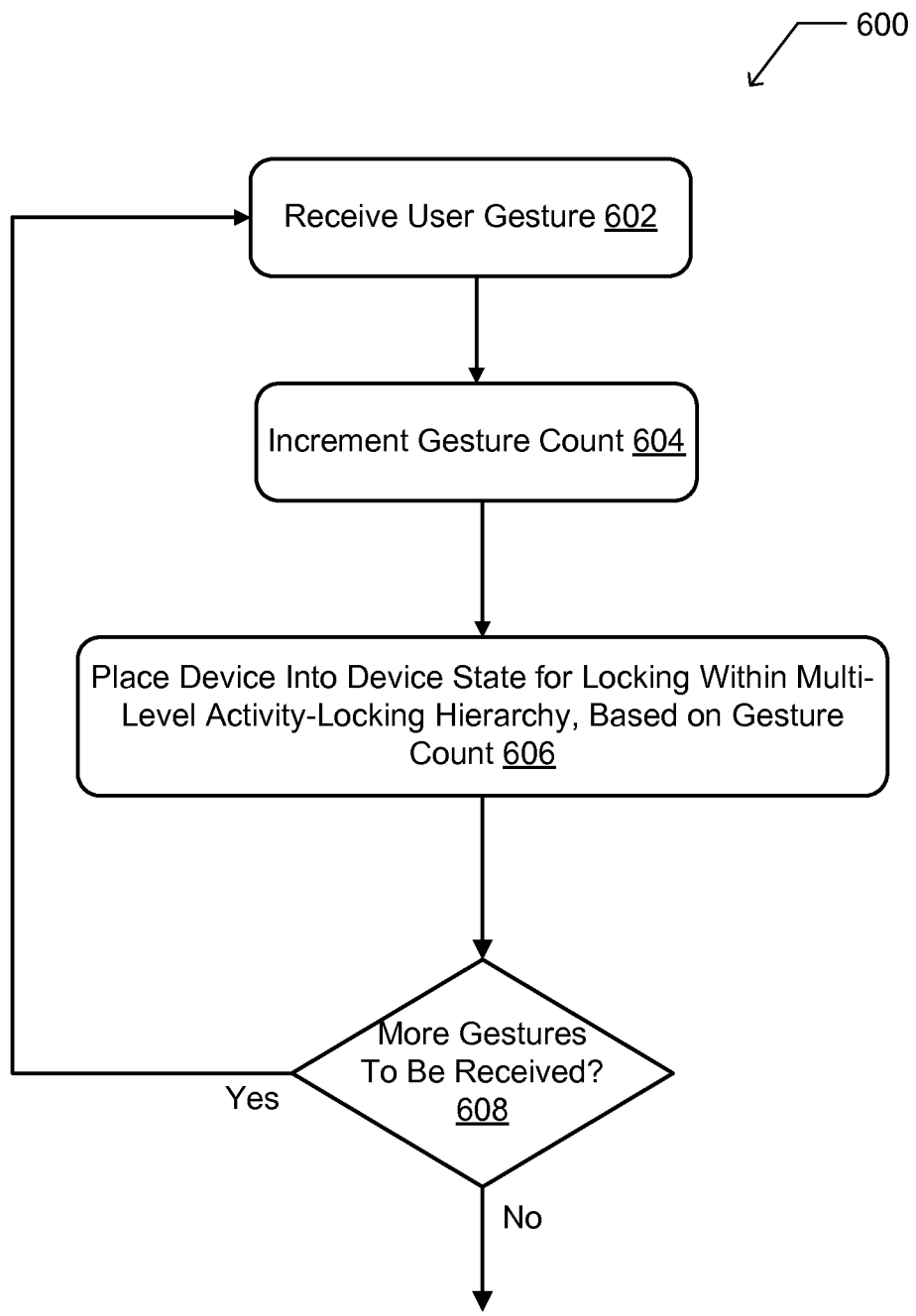
FIG. 6 depicts a flow diagram of an illustrative process determining a level of device locking based on received gestures, in accordance with embodiments.

Receiving the indication, and determining a device locking state based on the indication, is described in more detail with regard to FIG. 6, which depicts an example process 600 for determining a device locking state based on the indication. At 602 a user gesture is received. As described above, the user gestures may include explicit and implicit user gestures. In some embodiments, the user gesture may include a user's explicit selection of a hardware control on the device (e.g., a hard button), a selection of a software control in the UI of the device (e.g., a soft button), a voice command, a shake or other movement of the device, or some other explicit gesture. In some embodiments, the user gesture may be implicit, such as the sharing user handing the device to another user. At 604 a gesture count is incremented based on a detection of the user gesture at 602.

At 606 a determination is made of a device state for locking the device, the device state within a multi-level hierarchy of states. In some embodiments, this determination is made based on the gesture count. In this way, embodiments of the multi-level activity-locking mechanism may be described as iterative, such that the number of iterations of the gesture progressively indicates a level of device locking within the multi-level hierarchy, and/or such that each additional iteration of a gesture progressively places the device into a different state in the multi-level hierarchy.

At 608 a determination is made whether more gestures are to be received. In some embodiments, this determination may be made based on a measurement of an amount of time that has elapsed since the last gesture. For example, embodiments may support a predetermined period of time (e.g., five seconds) from the last gesture to provide some bound on the period of time for receiving gestures. In some embodiments, the determination of whether more gestures are to be received may be based on a user's input to a dialog or other UI element, such as the notifications 110, 116, and 122 shown in FIG. 1. If the determination is made that more gestures are to be received, process 600 returns to 602 to receive another gesture. If the determination is made that no further gestures are to be received, then process 600 may return or exit.

The following are examples of various hierarchies supported by embodiments.

EXAMPLE 1

Some embodiments support a multi-level activity-locking hierarchy of the following form:

Application Class→Application→Application Task→Fully Locked

For example, the currently active application may be a chess game, and a sharing user wants to give the device to a receiving user, while restricting the receiving user's access to data and/or functionality on the device. The sharing user performs one gesture, which indicates a first level of device locking in which the receiving user has access to games generally (e.g., to a class of applications that has the chess game as a member). If the sharing user performs a second gesture, this indicates that the receiving user is limited to playing the currently active game application, i.e. chess. If the sharing user performs a third gesture, this indicates that the receiving user is limited to playing the currently active game application until the currently active game of chess is complete. That is, the receiving user is limited to a current task within the current application. If the sharing user performs a fourth gesture, this places the device into a fully locked mode.

EXAMPLE 2

Some embodiments support a multi-level activity-locking hierarchy of the following form:

Application→Application→Task Fully Locked

For example, the currently active application may be a voice call application. This application may enable telephone calls over a wireless carrier network or using Voice Over IP (VoIP). A first gesture by the sharing user indicates a first level of device locking in which the receiving user is limited to using the currently active voice call application to initiate or receive calls. A second gesture by the sharing user indicates a second level of device locking in which the receiving user is limited to using the currently active voice call application to complete the currently active conversation, i.e., until the completion of the current task within the application. In some embodiments, after the conversation is complete the device may return to a fully locked state. A third gesture by the sharing user indicates a third level of device locking which places the device into a fully locked state.

EXAMPLE 3

Some embodiments support an activity locking-hierarchy of the following form:

Application Task→Fully Locked

For example, the currently active application may be an email application, and the sharing user is loaning the device to the receiving user to read a particular email. A first gesture by the sharing user indicates that access is to be limited to reading the particular email that is currently open on the device. In some embodiments, when this particular email is closed the device may return to a fully locked state. A second gesture by the sharing user indicates that the device is to be fully locked.

Other embodiments may support other hierarchies with other degrees of activity-locking scoping based on a number of iterations of a gesture. For example, some embodiments may include a level even more limited in scope that the Application Task level, in which a device allows access to an application task but limits the functionality available within that particular task. Some embodiments may also support a level that an application sub-class level that is intermediate between application class and a particular application. For example, a device may be enabled to execute a sub-class of games (e.g., puzzle games, strategy games) but not all types of games. Moreover, some embodiments may allow associating a time limit or deadline for sharing a device for specific applications or tasks within applications. In such cases, the applications and/or tasks are shared for a maximum amount of time and after that time the device returns to a fully locked state.

Returning to FIG. 5, at 504 a determination is made of those applications (if any) that are currently active and/or executing on the device. In some embodiments, this includes the determination of application(s) that are executing in the foreground of the device interface, such that the application(s) expose a user interface that may be manipulated by a user of the device. Application(s) may be any type of application, function, program and the like that are executable by the device, including but not limited to communications functions/applications (e.g., email, instant messaging (IM), text messaging, blogging, social networking, telephony applications, voice chat, video chat), games, multimedia entertainment applications (e.g., playing stored or stream audio, video, or graphics), video or image recording application, audio recording applications, document processing/viewing/editing applications, web browsing applications, information applications (e.g., providing information on weather, sports, investments, news, traffic, and the like), navigation applications, and the like.

In some embodiments, determination of a currently active application or function includes determination of a particular task that is active within the application or function. For example, where the current application is an email application the current task may be reading or composing a particular email, viewing a particular folder of emails, viewing an address book, and the like. As another example, where the current application is an audio player the current task may be playing a particular song or a particular collection of songs.

Further, some embodiments may support the definition of one or more user groups for the device, to be employed in conjunction with the activity-locking functionality described herein. For example, a user group of "children" may be defined for the device, and a particular activity-locking state for the device may be defined for that user group to enable such activities as games, educational videos, and/or other age-appropriate applications and functions.

In some embodiments, determination of the device state may be based on which applications and/or application tasks are currently active, as well as the number of gesture iterations received. For example, if the current application is a voice telephony application, a first gesture may lock the device to enable use of that particular telephony application and no other applications. However, if the current application is a game, the first gesture may enable use of any application in that class (e.g., any game application) and the second gesture locks the device for use of that particular game application. Moreover, some embodiments support instrumentation or other design and coding of an application to determine which device state corresponds to a particular number of received gestures when that application is active.

At 506 the device is locked into the determined device state to restrict functions based on the currently active application(s), the device state determined based on the received indication (e.g., a set of iterated gestures) as described with regard to FIG. 6. In some embodiments, certain application(s) and/or function(s) of the device may still be available even when the device is in a fully locked state. For example, the fully locked device may still allow phone calls to be made (e.g., emergency phone calls), calls to be received, photographs to be taken using a camera function, and the like. In some embodiments, such application(s) and/or function(s) may also be available when the device is in an activity-locked device state. For example, the device may be in a state where functionality is limited to playing an audio file, but the device may still enable a user to make emergency calls, receive incoming telephone calls (e.g., local, long-distance, domestic, and/or international calls), or take a photograph. In some embodiments, the activity-locked device state may be considered a device sharing state. Thus, the owner of the device may share the device with another user while the device is in the activity-locked state, and have confidence that the other user's activities are restricted to the authorized activity (e.g., application, function, or task).

At 508 the device is unlocked or returned to a fully locked state based on the satisfaction of one or more criteria for the termination of the activity-locking state. Various criteria may be employed to determine when or if to unlock the device (e.g., place it into a state of unlimited access to data and functionality) or when to return the device to a fully locked state. Such criteria are described further herein with regard to FIG. 7. Example criteria may include, but are not limited to, expiration of a predefined time period, termination of a current application, completion of a current application task, and receipt of a valid user credential.

Figure 7:
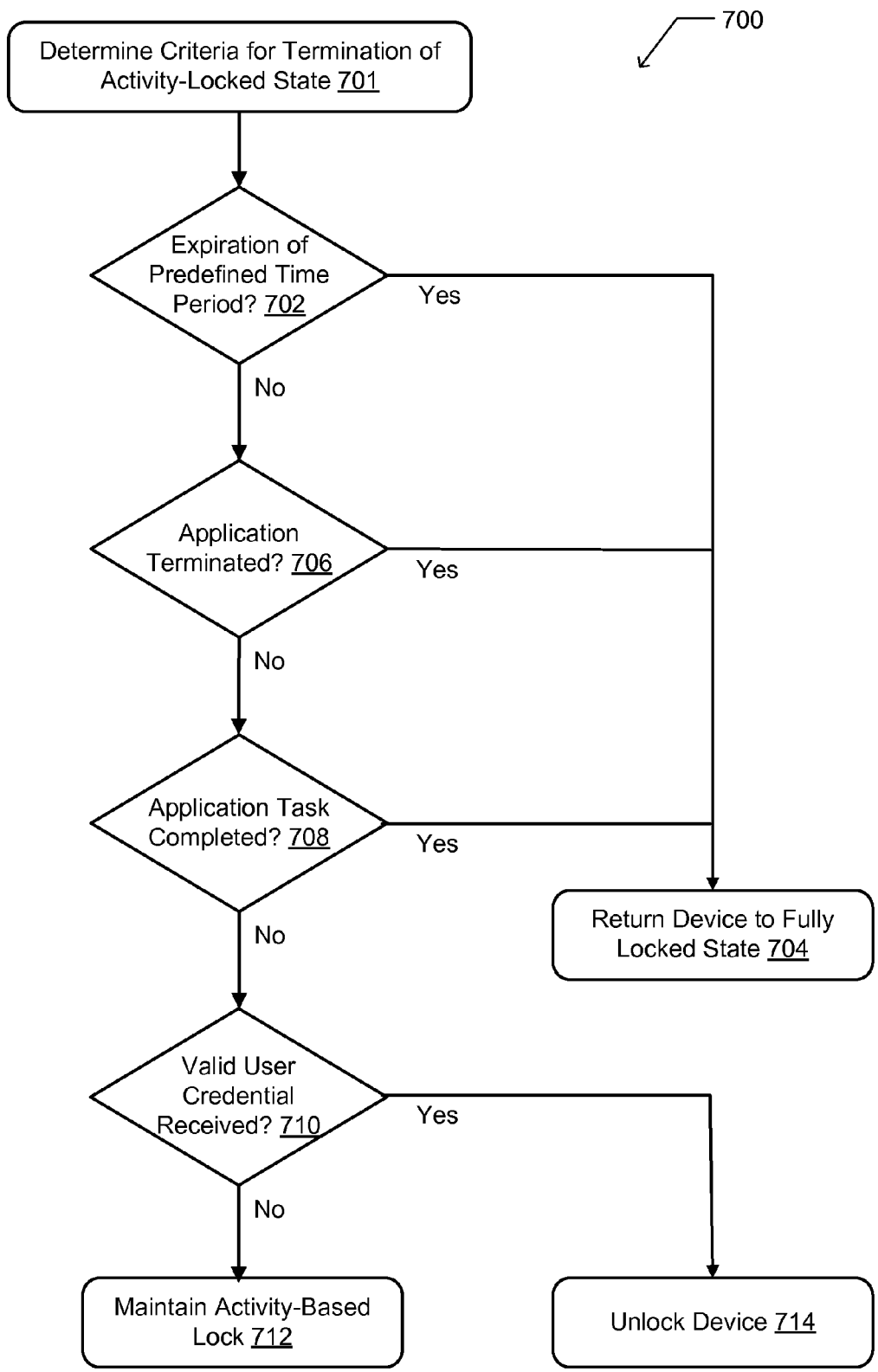
FIG. 7 depicts a flow diagram of an illustrative process for device unlocking based on various criteria, in accordance with embodiments.

As shown in FIG. 7, at 701 one or more criteria are determined for termination of the activity-locked state (e.g., device-sharing state) state. In some embodiments, these criteria are configured by the sharing user and/or the device owner. Some embodiments may enable the criteria to be set by the sharing user when the device is placed into the activity-locked state. For example, the device owner may place the device into an activity-locked state in which device activities are restricted to playing a game, and the device owner may specify that the activity-locked state is to expire after a predefined or predetermined time period (e.g., one hour). In this example, the termination criterion is expiration of the predefined time period. In some embodiments, the device may be programmed with one or more default termination criterion to be used when the user does not specify a particular criterion. For example the default termination criterion may be completion of the application, task, or other activity. In some embodiments, information regarding the owner-selectable and/or default termination criteria is stored locally on the device. In some embodiments, such information is stored on a networked server accessible to the device.

Embodiments support various termination criteria that may be specified by the device owner and/or set as default. For example, termination criteria for terminating the activity-locked state may include one or more of the following:

Expiration of a predefined or predetermined time period. This time period may be specified by the device owner when the device is placed into the activity-locked mode, or may be a default time period.

Termination of the application and/or the application becoming suspended or otherwise non-active.

Completion of a particular task within the application.

Receipt of a valid user credential.

These possible criteria are described further below with regard to blocks 702-712. Other types of criteria may be supported by embodiments. Blocks 702, 706, 708, and 710 reflect embodiments in which the specified termination criteria include one or more of the following: expiration of a predefined time period, termination of an application, completion of an application task, and receipt of a valid user credential.

At 702, in embodiments where the termination criteria include expiration of a predefined time period, a determination is made whether a predefined period of time has expired. For example, a sharing user may unlock game functionality on a device for 30 minutes. In some embodiments, the period of time may be predetermined based on the class of application, the particular application, or a particular task within the application. In some embodiments, the period of time may be specified by the sharing user through a user interface element on the device when the sharing user places the device into an activity-preserving locked state. If it is determined at 702 that such a predefined time period has expired, process 700 proceeds to return the device to a fully locked state at 704. In some embodiments, the device in the fully locked state may be unlocked by a user providing a valid user credential. If it is determined at 702 that the predefined time period has not expired, process 700 proceeds to determine whether other termination criteria are satisfied.

At 706, in embodiments where the termination criteria include termination of an application, a determination is made whether the application has terminated. For example, a sharing user may unlock the device to enable a receiving user to watch a video on the device until a video player application terminates, e.g. when the video ends or when the receiving user closes the player application, presses the home button on the device, and/or shifts focus away from the active application or function. If it is determined at 706 that the application has terminated, process 700 proceeds to return the device to a fully locked state at 704. If it is determined at 706 that the application has not terminated, process 700 proceeds to determine whether other termination criteria are satisfied.

At 708, in embodiments where the termination criteria include completion of an application task, a determination is made whether the authorized application task is completed. For example, a sharing user may unlock the device to enable a receiving user to read a particular email message within an email application, and this task may be completed when the receiving user closes the message. If it is determined at 708 that the application task has completed, process 700 proceeds to return the device to a fully locked state at 704. If it is determined at 708 that the application task has not completed, process 700 proceeds to determine whether other termination criteria are satisfied. If one or more of these criteria are satisfied at 702, 706, or 708, the device may be returned to its fully locked state at 704. Thus, embodiments enable the sharing user to authorize a receiving user to use the device for a limited purpose, and the device returns to its fully locked state when that purpose is complete.

At 710, in embodiments where the termination criteria include receipt of a valid user credential, a determination is made whether a valid user credential has been received at the device. A valid user credential may include any information used to identify a user who is authorized to access all data and/or functionality of the device. Credentials may include, but are not limited to, a user login, a password, a PIN, and a drawn pattern. Credentials may also include biometric identifications such as voice pattern, fingerprint, retina, and face recognition. In some embodiments, receipt of a valid user credential may always serve to fully unlock the device, regardless of the other termination criteria that have been set by the user or set by default. If a valid user credential is received at 710, the device may be returned to its fully unlocked state at 714. If all criteria 702, 706, 708, and 710 are unsatisfied, the device may remain in its activity-preserving locked state.

Figure 8:
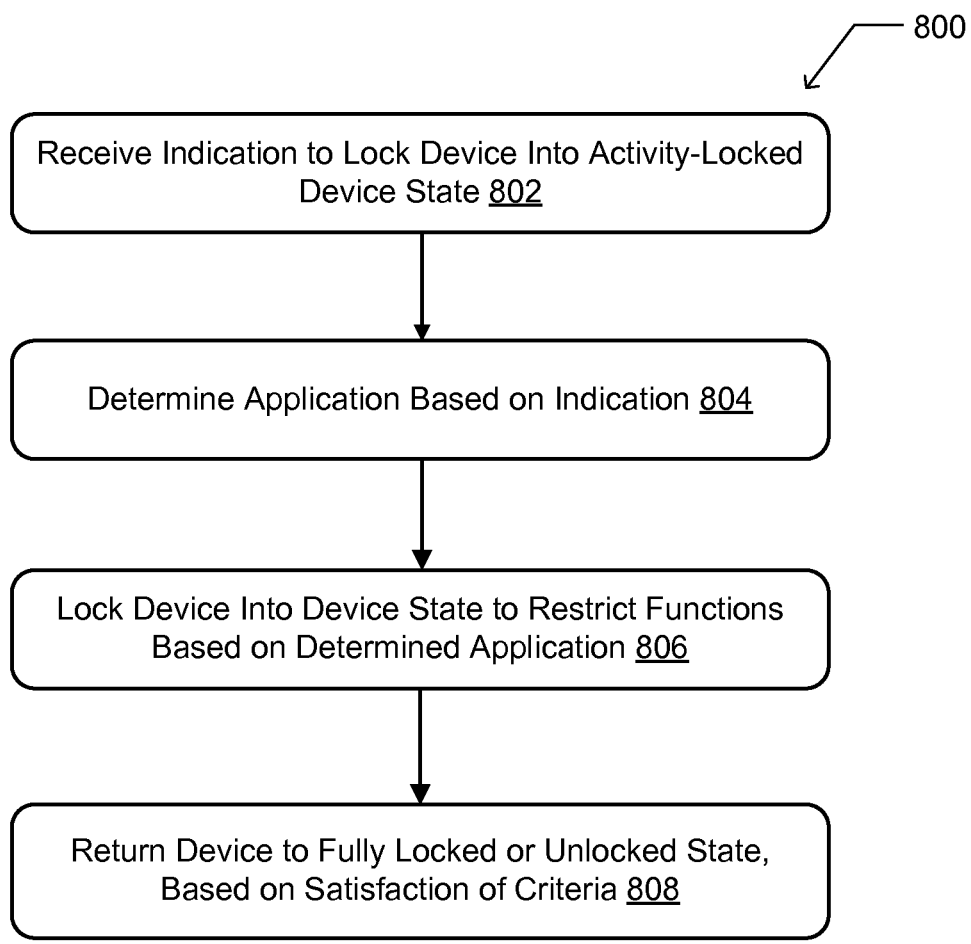
FIG. 8 depicts a flow diagram of an illustrative process for activity-based device locking, according to embodiments.

FIG. 8 depicts an example process 800 for device locking for a particular activity, function, or application, according to embodiments. In some embodiments, the device may be in an unauthenticated or fully locked state prior to receiving one or more gestures indicating activity-preserving device locking, and/or not currently executing an application. In such cases, the particular gesture(s) may indicate the application to be enabled for restricted access on the device. For example, with the phone in a locked state the sharing user may issue a voice command "enable guest call," and the device may be put into a state where the receiving user is allowed to make telephone calls, but not access other data or functionality on the device.

At 802 an indication is received to lock the device into an activity-locked device state, while the device is in a fully locked state or while the device is not currently executing an active application. At 804 an application or activity is determined based on the particular indication received at 802. For example, the sharing user may issue a voice command "enable guest call" and the determined application may be a voice telephony application. In other embodiments, the indication may be a user gesture to press a hard or soft button that is associated with a particular application or class of applications on the device. For example, a soft button may be associated with an image or video camera.

At 806 the device may be locked into a device state in which functions are restricted to the application determined based on the indication. This locking may proceed as described above. At 808 the device may return to its fully locked state or fully unlocked state based on satisfaction of one or more criteria as described above with regard to FIG. 7.

Conclusion

Although the techniques have been described in language specific to structural features and/or methodological acts, it is to be understood that the appended claims are not necessarily limited to the specific features or acts described. Rather, the specific features and acts are disclosed as example forms of implementing such techniques.

What is claimed is:

1. A computer-implemented method comprising:
    receiving one or more user gestures at a device that is to be locked into a device state within a multi-level activity-locking hierarchy of states, the device state, among multiple possible device states within the multi-level activity-locking hierarchy of states, being based at least in part on the one or more user gestures received at the device;
    determining at least one application on the device; and
    locking the device into the device state, such that available activities of the device are restricted based at least in part on the device state and on the at least one application.

2. The method of claim 1, wherein the one or more user gestures include one or more iterations of a same user gesture, a number of the one or more iterations out of multiple possible iterations of the same user gesture indicating the device state within the multi-level activity-locking hierarchy of states.

3. The method of claim 1, wherein the multi-level activity-locking hierarchy of states includes:
    a first state restricted to a class of applications that includes the at least one application;
    a second state restricted to the at least one application; and
    a third state restricted to an application task within the at least one application.

4. The method of claim 1, wherein the multi-level activity-locking hierarchy of states includes:
    a first state restricted to the at least one application; and
    a second state restricted to an application task within the at least one application.

5. The method of claim 1, further comprising unlocking the device based on receipt of a valid user credential.

6. The method of claim 1, further comprising placing the device into a fully locked state based on one or more criteria, including at least one of:
    an expiration of a predefined time period;
    a termination of the at least one application; or
    a completion of an application task within the at least one application.

7. The method of claim 1, wherein the at least one application is a currently active application on the device when the one or more user gestures are received at the device.

8. The method of claim 1, wherein the device is in an unauthenticated state prior to the receiving the one or more user gestures at the device, and wherein the at least one application is determined based on the received one or more user gestures.

9. A device comprising:
    at least one processor;
    a memory;
    a locking component stored in the memory and executable by the at least one processor to:
        receive, while the device is executing at least one currently active application, an indication to lock the device into a device state within a multi-level activity-locking hierarchy of states;
        determine the at least one currently active application on the device; and
        lock the device into the indicated device state that is based at least in part on the at least one currently active application, such that one or more available functions of the device are restricted according to the indicated device state.

10. The device of claim 9, wherein the indication includes one or more iterations of a same user gesture received at the device, the same user gesture including at least one of an explicit user gesture or an implicit user gesture, and wherein a number of the one or more iterations out of multiple possible iterations of the same user gesture indicates the device state within the multi-level activity-locking hierarchy of states.

11. The device of claim 10, further comprising a hardware control on the device, and wherein the one or more iterations of the same user gesture are received from one or more selections of the hardware control.

12. The device of claim 10, further comprising a display and a user interface stored in the memory and executable by the at least one processor to present a software control on the display, and wherein the one or more iterations of the same user gesture are received from one or more selections of the software control.

13. The device of claim 9, wherein the locking component is further configured to unlock the device based on receiving a valid user credential.

14. The device of claim 9, wherein the multi-level activity-locking hierarchy of states includes:
    a first state restricted to a class of applications that includes the at least one currently active application;
    a second state restricted to the at least one currently active application; and
    a third state restricted to an application task within the at least one currently active application.

15. The device of claim 9, wherein the multi-level activity-locking hierarchy of states includes a plurality of states of decreasing activity scope.

16. A system comprising:
at least one server device, configured to send a locking component to a remote device, wherein the locking component is configured to operate on the remote device to:
receive, while the remote device is executing at least one currently active application, an indication to lock the remote device into a device state within a multi-level activity-locking hierarchy of states; and
lock the remote device into the indicated device state based at least in part on the at least one currently active application, such that one or more available functions of the remote device are restricted according to the indicated device state.

17. The system of claim 16, wherein the indicated device state restricts the one or more available functions of the remote device to the at least one currently active application.

18. The system of claim 16, the locking component being further configured to place the remote device into a fully locked state based on one or more criteria including at least one of:

an expiration of a predefined time period;
a termination of the at least one currently active application; or
a completion of an application task within the at least one currently active application.

19. The system of claim 16, wherein the multi-level activity-locking hierarchy of states includes:
a first state restricted to the at least one currently active application; and
a second state restricted to an application task within the at least one currently active application.

20. The system of claim 16, wherein the multi-level activity-locking hierarchy of states includes:
a first state restricted to a class of applications that includes the at least one currently active application;
a second state restricted to the at least one currently active application; and
a third state restricted to an application task within the at least one currently active application.

* * * * *